(12) United States Patent
Ozeki (10) Patent No.: US 8,976,304 B2
(45) Date of Patent: Mar. 10, 2015

(54) DISPLAY DEVICE AND TELEVISION RECEIVER DEVICE

(71) Applicant: Sharp Kabushiki Kaisha, Osaka (JP)

(72) Inventor: Tsuyoshi Ozeki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 5 days.

(21) Appl. No.: 14/349,559

(22) PCT Filed: Sep. 28, 2012

(86) PCT No.: PCT/JP2012/075064
§ 371 (c)(1),
(2) Date: Apr. 3, 2014

(87) PCT Pub. No.: WO2013/051472
PCT Pub. Date: Apr. 11, 2013

(65) Prior Publication Data
US 2014/0247397 A1    Sep. 4, 2014

(30) Foreign Application Priority Data
Oct. 6, 2011 (JP) ................................ 2011-222192

(51) Int. Cl.
*H04N 5/64* (2006.01)
*F21V 8/00* (2006.01)
*G02F 1/1335* (2006.01)
*G06F 1/16* (2006.01)
(Continued)

(52) U.S. Cl.
CPC ........ *G02B 6/0085* (2013.01); *G02F 1/133615* (2013.01); *G06F 1/1601* (2013.01); *G02F 2001/133314* (2013.01); *G02F 2001/13332* (2013.01); *G02F 2001/133628* (2013.01); *G02F 2201/503* (2013.01); *G06F 1/20* (2013.01);
(Continued)

(58) Field of Classification Search
USPC ................ 348/790, 787, 789, 825, 836, 794; 349/62, 161, 158, 58; 345/87, 82; 362/611, 612, 615
See application file for complete search history.

(56) References Cited

U.S. PATENT DOCUMENTS 8,596,853 B2 *  12/2013  Mikami .................... 362/616
2009/0096957 A1 *  4/2009  Hiyama et al. ............ 349/65
2013/0094245 A1   4/2013  Kanda et al.

FOREIGN PATENT DOCUMENTS

JP    2008-165101 A    7/2008
JP    2008-304630 A    12/2008
(Continued)

*Primary Examiner* — Jefferey Harold
*Assistant Examiner* — Jean W Desir
(74) *Attorney, Agent, or Firm* — Chen Yoshimura LLP (57) ABSTRACT

A liquid crystal display device 10 of the present invention includes: LEDs 22; LED substrates 24 to which the LEDs 22 are attached; a liquid crystal panel 11 where display is performed using light from the LEDs 22; a light guide plate 16 that is arranged so as to overlap the side of the liquid crystal panel 11 opposite to the display surface, the edge faces of the light guide plate facing the LEDs 22; a chassis 14 arranged on the side of the light guide plate 16 opposite to the liquid crystal panel 11; a frame 13 arranged on the display surface side of the liquid crystal panel 11 and housing the LEDs 22, LED substrates 24, liquid crystal panel 11, and light guide plate 16 between the chassis 14 and the frame itself; and heat dissipating members 18 with heat dissipating characteristics that are respectively arranged abutting the LED substrates 24 and that are held between the frame 13 and the chassis 14.

12 Claims, 7 Drawing Sheets

(51) Int. Cl.
  *G06F 1/20* (2006.01)
  *G02F 1/1333* (2006.01)
(52) U.S. Cl.
  CPC .......... *H04N 5/64* (2013.01); *G06F 2200/1612* (2013.01); *G02B 6/0091* (2013.01)
  USPC ........... 348/794; 348/790; 348/787; 348/789; 348/825; 348/836

(56) References Cited

FOREIGN PATENT DOCUMENTS

| | | |
|---|---|---|
| JP | 2009-245882 A | 10/2009 |
| JP | 2010-212055 A | 9/2010 |
| JP | 4777469 B1 | 9/2011 |

* cited by examiner

DISPLAY DEVICE AND TELEVISION RECEIVER DEVICE

TECHNICAL FIELD

The present invention relates to a display device and a television receiver.

BACKGROUND ART

A liquid crystal display device has a liquid crystal display unit in which a liquid crystal panel and a backlight device are held as an assembled component by a metal bezel that is placed over the liquid crystal panel from the front side thereof, and typically, the liquid crystal display unit is enclosed by a synthetic resin cabinet that is an exterior member, thereby being provided as a product.

In recent years, because of demands for lower manufacturing cost, an even thinner device, and the like, elimination of the synthetic resin cabinet is being considered. If the cabinet is eliminated, however, the members such as the bezel that were housed in the cabinet in the conventional configuration are exposed to the outside. These members receive heat from the light source, and are therefore likely to be hot. Therefore, a heat dissipating member with heat dissipating characteristics has sometimes been attached to the light source substrates. An example of such a liquid crystal display device is disclosed in Patent Document 1, for example.

RELATED ART DOCUMENT

Patent Document

Patent Document 1: Japanese Patent Application Laid-Open Publication No. 2010-212055

Problems to be Solved by the Invention

However, the liquid crystal display device described above in Patent Document 1 has a projection below the heat dissipating member on which the light sources are mounted. There is also an opening that can engage this projection on a location of the casing corresponding to the projection. The heat dissipating member is attached to the casing by the projection of the heat dissipating member engaging this opening. Therefore, there is a risk that forming the projection during the manufacturing process of the liquid crystal display device will require extra time, money, and the like. When such a projection or the like is not provided, it is common to affix the heat dissipating member to the casing with screws, but this requires a large number of screws in order to affix the heat dissipating member.

SUMMARY OF THE INVENTION

The technology disclosed in the present specification was made in view of the above-mentioned problems. The present invention aims at providing a technology that makes it possible to attach a heat dissipating member in a display device that is not provided with a cabinet by using a simple configuration without screws and without hindering the heat dissipating characteristics of the heat dissipating member.

Means for Solving the Problems

The technology disclosed in the present specification relates to a display device that includes: light sources; light source substrates having the light sources attached thereto; a display panel having a display surface where display is performed with light from the light sources; a light guide plate arranged overlapping a side of the display panel opposite to the display surface, the light guide plate having edge faces respectively facing the light sources; a chassis arranged on a side of the light guide plate opposite to the display panel; a frame member arranged on the display surface side of the display panel and housing the light sources, the light source substrates, the display panel, and the light guide plate together with the chassis; and heat dissipating members having heat dissipating characteristics that respectively abut the light source substrates and that are held between the frame member and the chassis.

With the above-mentioned display device, the heat dissipating members are held by being sandwiched between the frame member and the chassis. Therefore, in the display device without a cabinet, it is possible to attach the heat dissipating members without hindering the heat dissipating characteristics thereof by using a simple configuration with no screws or the like.

The frame member may have first recessed areas that open towards the chassis, the chassis may have second recessed areas that open towards the display panel, and the respective heat dissipating members may be held between the frame member and the chassis in a state in which an edge of the respective heat dissipating members facing the chassis and an edge of each of the respective heat dissipating members facing the frame member respectively engage the first recessed area and the second recessed area.

With this configuration, a specification configuration for holding the heat dissipating members by sandwiching the heat dissipating members between the frame member and the chassis can be achieved.

Each of the heat dissipating members may be plate-shaped and a surface thereof may abut the respective light source substrates.

With this configuration, the heat dissipating members can respectively engage the first recessed areas and the second recessed areas with ease.

A surface of each of the heat dissipating members opposite to the surface abutting each of the light source substrates may abut the frame member and the chassis.

With this configuration, the contact area of the heat dissipating member with respect to the frame member and the chassis increases, thereby making it possible to increase the heat dissipating characteristics of the heat dissipating member.

Each of the light source substrates may be held between the frame member and the chassis.

With this configuration, each of the light source substrates is in contact with the frame member and the chassis; therefore, the heat dissipating characteristics can be increased.

A thickness of each of the heat dissipating members may be greater than a sum of a thickness of each of the light source substrates and a thickness of each of the light sources.

With this configuration, the contact area of the heat dissipating member with respect to the frame member and the chassis increases, thereby making it possible to increase the heat dissipating characteristics of the heat dissipating member.

The frame member may have first projections in the respective first recessed areas projecting towards the chassis, the chassis may have second projections in the respective second recessed areas projecting towards the frame member, grooves may be disposed on the respective heat dissipating members, the grooves being able to respectively engage the first projections and the second projections, and the first projections and the second projections may respectively engage the grooves in a state in which the heat dissipating members respectively engage the first recessed areas and the second recessed areas.

With this configuration, the contact area of the heat dissipating member with respect to the frame member and the chassis increases in a state in which the heat dissipating members respectively engage the first recessed areas and the second recessed areas, thereby making it possible to increase the heat dissipating characteristics of the heat dissipating member.

An elastic member may be interposed between the frame member and the display panel.

With this configuration, it is possible to prevent damage by the edge of the display panel abutting the frame member.

The light sources may be white light emitting diodes.

With this configuration, it is possible to extend the life of the light sources and reduce the power consumption thereof.

The techniques disclosed in the present specification can be expressed as a display device that includes a display panel that displays images using light from the above-mentioned illumination device. Also, a display device that uses a liquid crystal panel that uses liquid crystal as the display panel is novel and useful. A television receiver that includes the above-mentioned display device is also novel and useful.

Effects of the Invention

The present invention aims at providing a technology that makes it possible to attach a heat dissipating member in a display device that is not provided with a cabinet by using a simple configuration without screws and without hindering the heat dissipating characteristics of the heat dissipating member.

DETAILED DESCRIPTION OF EMBODIMENTS

<Embodiment 1>

Figure 1:
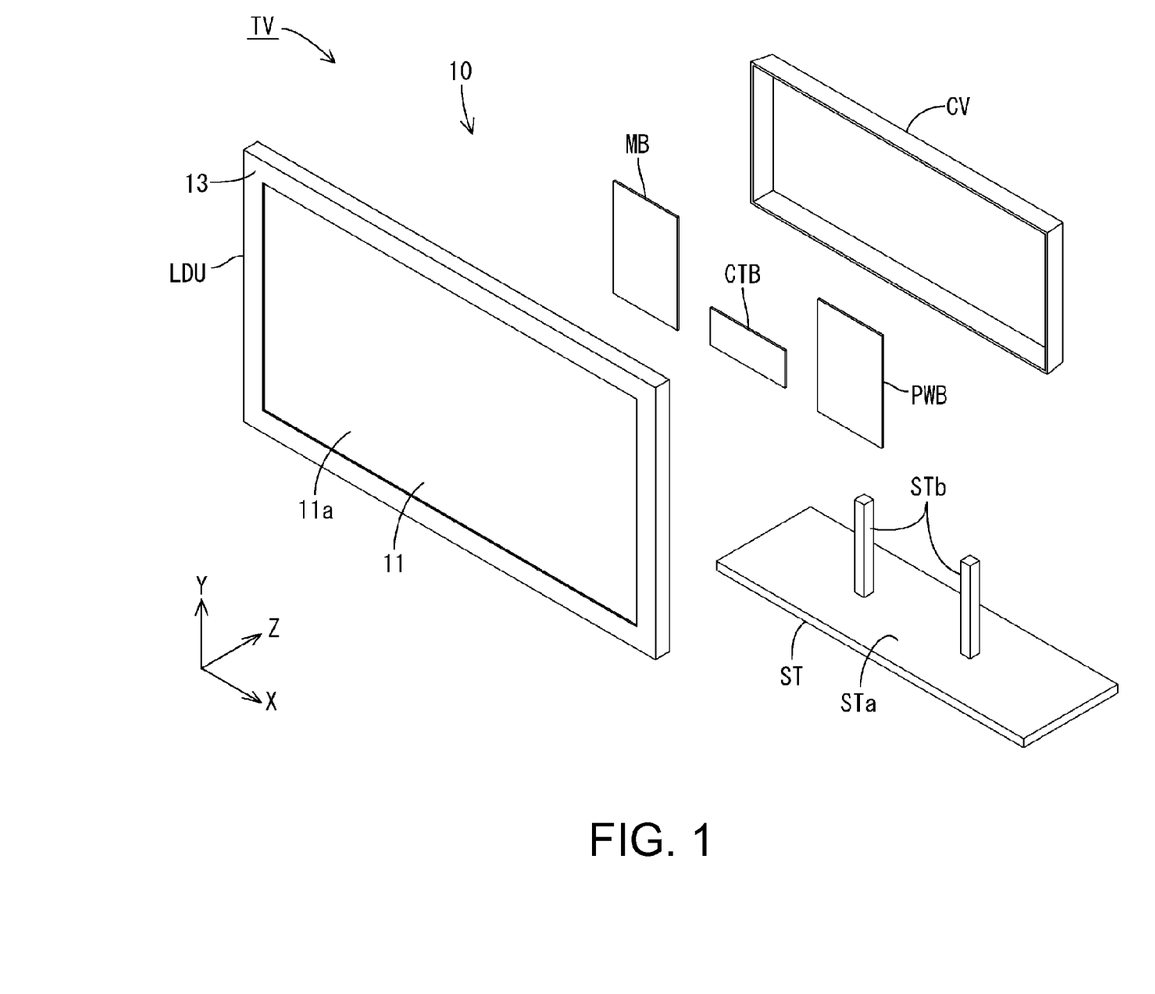
FIG. 1 is an exploded perspective view of a television receiver TV according to Embodiment 1.
Figure 2:
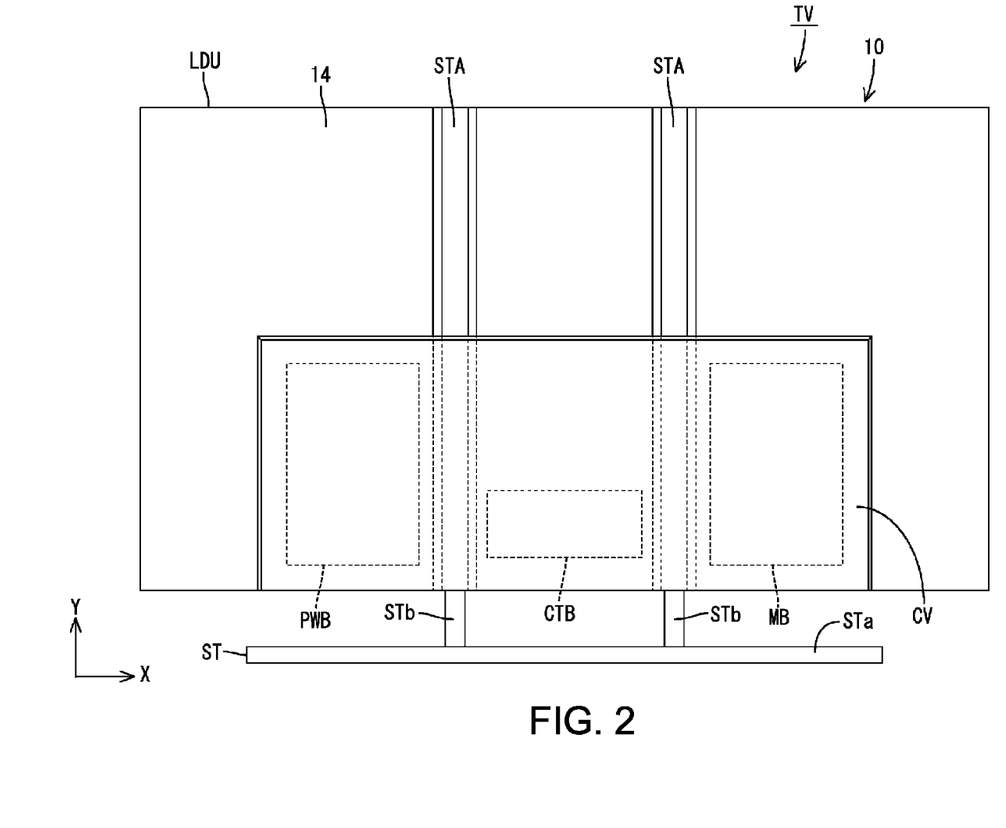
FIG. 2 shows a rear view of the television receiver TV and a liquid crystal display device 10.
Figure 3:
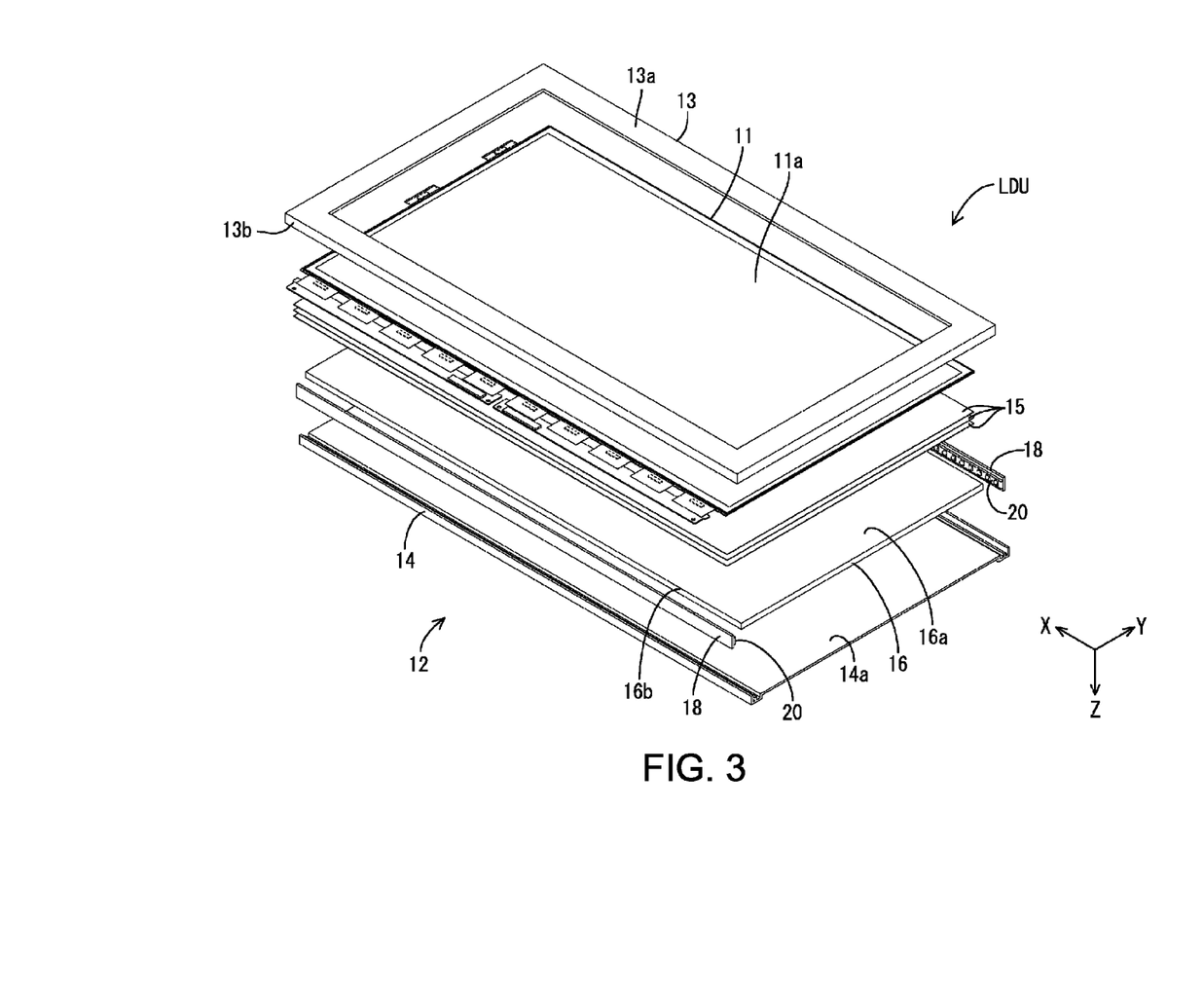
FIG. 3 is an exploded perspective view of the liquid crystal display device 10.
Figure 4:
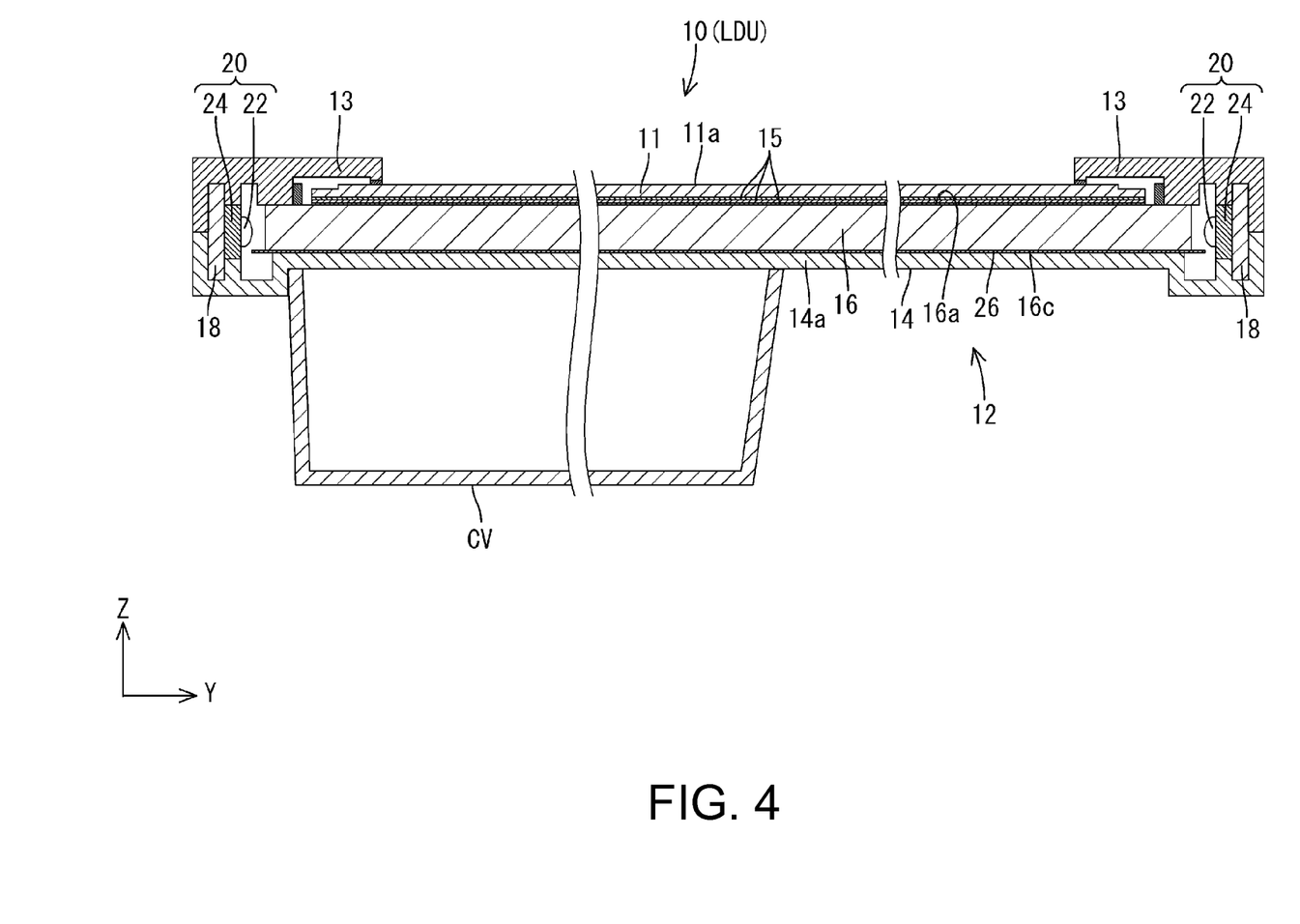
FIG. 4 is a cross-sectional view of the liquid crystal display device 10 along the short side direction.

Embodiment 1 will be described with reference to the drawings. FIG. 1 is an exploded perspective view of a television receiver TV according to Embodiment 1. FIG. 2 shows a rear view of the television receiver TV and a liquid crystal display device 10. FIG. 3 is an exploded perspective view of the liquid crystal display unit forming a part of the liquid crystal display device 10. FIG. 4 is a cross-sectional view of the liquid crystal display device 10 along the short side direction. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

The television receiver TV is constituted of: a liquid crystal display unit LDU; various types of boards PWB, MB, and CTB attached to the rear side (back side) of the liquid crystal display unit LDU; a cover member CV attached to the rear side of the liquid crystal display unit LDU covering the various types of boards PWB, MB, and CTB; and a stand ST. The stand ST holds the television receiver TV in a state in which the display surface of the liquid crystal display unit LDU is in the vertical direction (Y axis direction). The liquid crystal display device 10 of the present embodiment is the portion excluding the configuration for receiving television signals (such as a tuner part of the main board MB) from the television receiver TV having the above-mentioned configuration. As shown in FIG. 3, the liquid crystal display unit LDU has a horizontally-long quadrangular shape (rectangular) as a whole, and includes a liquid crystal panel 11, which is a display panel, and a backlight device 12, which is an external light source. These are integrally held together by a frame 13 and a chassis 14, which are external members that constitute the exterior of the liquid crystal display device 10. The chassis 14 of the present embodiment constitutes one of the exterior members and is also a part of the backlight device 12.

First, the configuration of the rear side of the liquid crystal display device 10 will be explained. As shown in FIG. 2, on the rear of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens toward the chassis 14, and a pair of support columns STb of the stand ST is inserted into respective spaces formed between the stand attachment members STA and the chassis 14, respectively. Wiring members (such as electric wires) connected to an LED substrate 24 of the backlight device 12 run through a space inside of the stand attachment members STA. The stand ST is constituted of a base STa that is disposed in parallel with the X axis direction and the Z axis direction, and a pair of support columns STb standing on the base STa along the Y axis direction. The cover member CV is made of a synthetic resin, and is attached so as to cover approximately a half of the lower part of the rear side of the chassis 14 of FIG. 2, while crossing over the pair of stand attachment members STA along the X axis direction. Between the cover member CV and the chassis 14, a component housing space is provided to house the components mentioned below such as the various boards PWB, MB, and CTB.

As shown in FIG. 2, the various boards PWB, MB, and CTB include a power supply board PWB, a main board MB, and a control board CTB. The power supply board PWB is a power source for the liquid crystal display device 10, and can supply driving power to other boards MB and CTB, LEDs 22 of the backlight device 12, and the like. Accordingly, the power supply board PWB doubles as an "LED driving board for driving the LEDs 22." The main board MB has at least a tuner part that can receive television signals, and an image processing part that performs image-processing on the received television signals (neither the tuner part nor the image processing part is shown in the figure), and can output the processed image signals to the control board CTB described below. When the liquid crystal display device 10 is connected to an external video playback device that is not shown, an image signal from the video playback device is inputted into the main board MB, and the main board MB can output the image signal to the control board CTB after processing the signal at the image processing part. The control board CTB has the function of converting the image signal inputted from the main board to a signal for driving liquid crystal, and supplying the converted signal for liquid crystal driving to the liquid crystal panel 11.

As shown in FIG. 3, the main constituting components of the liquid crystal display unit LDU, which forms a portion of the liquid crystal display device 10, are housed in a space between the frame 13 that constitutes the front exterior of the liquid crystal display device 10, and the chassis 14 that constitutes the rear exterior. The main constituting components housed between the frame 13 and the chassis 14 include at least the liquid crystal panel 11, optical members 15, a light guide plate 16, and LED units 20. Of these, the liquid crystal panel 11, optical members 15, and light guide plate 16 are held by being sandwiched between the frame 13 on the front side and the chassis 14 on the rear side while being stacked one on top of the other. The backlight device 12 is constituted of the optical members 15, the light guide plate 16, the LED units 20 and the chassis 14, and is the configuration that is obtained by excluding the liquid crystal panel 11 and the frame 13 from the liquid crystal display unit LDU described above. A pair of the LED units 20, which is a part of the backlight device 12, is disposed between the frame 13 and the chassis 14 so as to be on the respective sides of the light guide plate 16, across from each other in the short side direction (Y axis direction). The LED unit 20 is constituted of the LEDs 22, which are the light source, the LED substrate (light source substrate) 24 on which the LEDs 22 are mounted, and a heat dissipating member (heat spreader, light source attachment member) 18 to which the LED substrate 24 is attached. The respective constituting components will be explained below.

As shown in FIG. 3, the liquid crystal panel 11 is formed in a horizontally-long quadrangular shape (rectangular) in a plan view, and is configured by bonding a pair of glass substrates having high light transmittance to each other with a prescribed gap therebetween, and by injecting liquid crystal between the two substrates. On one substrate (array substrate), switching elements (TFTs, for example) respectively connected to mutually intersecting source wiring lines and gate wiring lines, pixel electrodes respectively connected to these switching elements, an alignment film, and the like are provided. Provided on the other substrate (CF substrate) are: color filters having colored parts such as R (red), G (green), and B (blue) being arranged in prescribed arrays; an opposite electrode; an alignment film; and the like. The liquid crystal panel 11 is stacked on the front side of the optical members 15 described below, and the rear surface thereof (outer surface of a polarizing plate on the rear side) is in close contact with the optical members 15 with almost no gap therebetween. With this configuration, dust and the like are prevented from entering the space between the liquid crystal panel 11 and the optical members 15. A display surface 11a of the liquid crystal panel 11 is constituted of a display region that is in the center of the surface and that can display images, and a non-display region that is in the outer edges of the surface and that is formed in a frame shape surrounding the display region. The liquid crystal panel 11 is connected to the control board CTB via driver parts for driving liquid crystal and a flexible substrate, and an image is displayed in the display region on the display surface 11a thereof on the basis of signals inputted from the control board CTB. Polarizing plates are respectively provided on outer sides of the two substrates. A portion of the frame 13 surface facing the liquid crystal panel 11 has elastic members 27 and 28 having elastic characteristics arranged thereon (see FIG. 5).

As shown in FIG. 3, the optical members 15 have a horizontally-long quadrangular shape in a plan view similar to the liquid crystal panel 11, and the size thereof (short side dimensions and long side dimensions) is similar to that of the liquid crystal panel 11. The optical members 15 are stacked on the front side (side from which light is emitted) of the light guide plate 16 described below, and are sandwiched between the liquid crystal panel 11 described above and the light guide plate 16. Each of the optical members 15 is a sheet-shaped member, and the optical members 15 are constituted of three sheets stacked together. Specific types of optical members 15 include a diffusion sheet, a lens sheet, a reflective polarizing sheet, and the like, for example, and it is possible to appropriately choose any of these as optical members 15.

The light guide plate 16 is made of a synthetic resin (an acrylic resin such as PMMA or a polycarbonate, for example) with a refractive index sufficiently higher than air and almost completely transparent (excellent light transmission). As shown in FIG. 3, the light guide plate 16 has a horizontally-long quadrangular shape in a plan view, in a manner similar to the liquid crystal panel 11 and the optical members 15, and has a plate shape that is thicker than the optical members 15. The long side direction on the main surface of the light guide plate corresponds to the X axis direction, the short side corresponds to the Y axis direction, and the plate thickness direction intersecting the main surface corresponds to the Z axis direction. The light guide plate 16 is stacked on the rear side of the optical members 15, and is sandwiched between the optical members 15 and the chassis 14. As shown in FIG. 4, in the light guide plate 16, at least the short side dimensions thereof are greater than the respective short side dimensions of the liquid crystal panel 11 and the optical members 15, and the light guide plate 16 is disposed such that respective edges in the short side direction (respective edges along the long side direction) protrude outward beyond respective edges of the liquid crystal panel 11 and the optical members 15 (so as not to overlap in a plan view). This light guide plate 16 is sandwiched in the Y axis direction by the pair of LED units 20 respectively arranged on both sides in the short side direction of the light guide plate 16, and light from the LEDs 22 respectively enters the edges of both sides of the light guide plate 16 in the short side direction. The light that has respectively entered from the LEDs 22 into both edges of the light guide plate 16 in the long side direction is internally propagated inside the light guide plate 16 and exits up towards the optical members 15 (towards the front).

Of the main surfaces of the light guide plate 16, the surface facing the front side (facing the optical members 15) is a light exiting surface 16a where internal light exits towards the optical members 15 and the liquid crystal panel 11. Of the peripheral edge faces adjacent to the main surface of the light guide plate 16, both edge faces of the light guide plate 16 in the long side direction along the X axis (both edge faces of the respective edges in the long side direction) are light receiving faces 16b that directly face the respective LEDs 22 (LED substrates 24) with prescribed gaps therebetween and that receive light emitted from the LEDs 22. The light receiving faces 16b are on a plane parallel to that defined by the X axis direction and the Z axis direction (main surface of the LED substrate 24), and are substantially perpendicular to the light exiting surface 16a. The direction at which the LEDs 22 and the light receiving faces 16b are aligned with respect to each other corresponds to the Y axis direction, and is parallel to the light exiting surface 16a.

As shown in FIG. 4, a reflective sheet 26 is provided on the rear side of the light guide plate 16, or namely, on a surface 16c opposite to the light exiting surface 16a (the surface facing the chassis 14). This reflective sheet 26 covers almost the entire surface 16c and can reflect light that exits to the rear side back towards the front side. In other words, the reflective sheet 26 is sandwiched between the chassis 14 and the light guide plate 16. The reflective sheet 26 is made of a synthetic resin, and the surface thereof is a highly reflective white. The short side dimensions of the reflective sheet 26 are greater than the short side dimensions of the light guide plate 16, and the respective edges thereof protrude beyond the light receiving faces 16b of the light guide plate 16 towards the LEDs 22. With the protruding portions of the reflective sheet 26, light that travels diagonally from the LEDs 22 towards the chassis 14 can be reflected efficiently, thereby directing the light toward the light receiving faces 16b of the light guide plate 16. At least one of either the light exiting surface 16a or the surface 16c opposite thereto of the light guide plate 16 is patterned so as to have reflective parts (not shown) that reflect internal light or scattering parts (not shown) that scatter internal light in a prescribed planar distribution. These parts control the light so that light exiting from the light exiting surface 16a will have a uniform planar distribution.

The pair of LED units 20 and 20 are respectively constituted of the LED substrates 24 and the LEDs 22. The LED substrates 24 extend in the long side direction of the chassis 14 in a state in which the plate surfaces of the LED substrates 24 are perpendicular to the bottom plate of the chassis and the LED substrates 24 are respectively facing the light receiving faces 16b of the light guide plate 16. The LEDs 22, which emit white light, are mounted in a row on one of the plate surfaces of each of the LED substrates 24 (the inner plate surface), and the other plate surface (the outer plate surface) abuts the heat dissipating member 18. The heat dissipating member 18 will be described in detail later. The top face of the LED substrate 24 abuts the frame 13, and the lower face abuts the chassis 14. In other words, the LED substrate 24 is held between the frame 13 and the chassis 14. The LEDs 22 may have a configuration in which white light is emitted by having a blue light emitting element coated with a fluorescent material that has a light emitting peak in the yellow region. The LEDs 22 may alternatively have a configuration in which white light is emitted by having a blue light emitting element coated with fluorescent materials that have light emitting peaks in the green region and the red region, respectively. The LEDs 22 may also have a configuration in which white light is emitted by having a blue light emitting element coated with a fluorescent material that has a light emitting peak in the green region, and combining this with a red light emitting element. The LEDs 22 may also have a configuration in which white light is emitted by combining a blue light emitting element, a green light emitting element, and a red light emitting element. The LEDs 22 may also be a combination of an ultraviolet light emitting element with fluorescent materials. In particular, the LEDs 22 may have a configuration in which white light is emitted by having the ultraviolet light emitting element coated with fluorescent materials that have light emitting peaks in the blue, green, and red regions, respectively.

Figure 5:
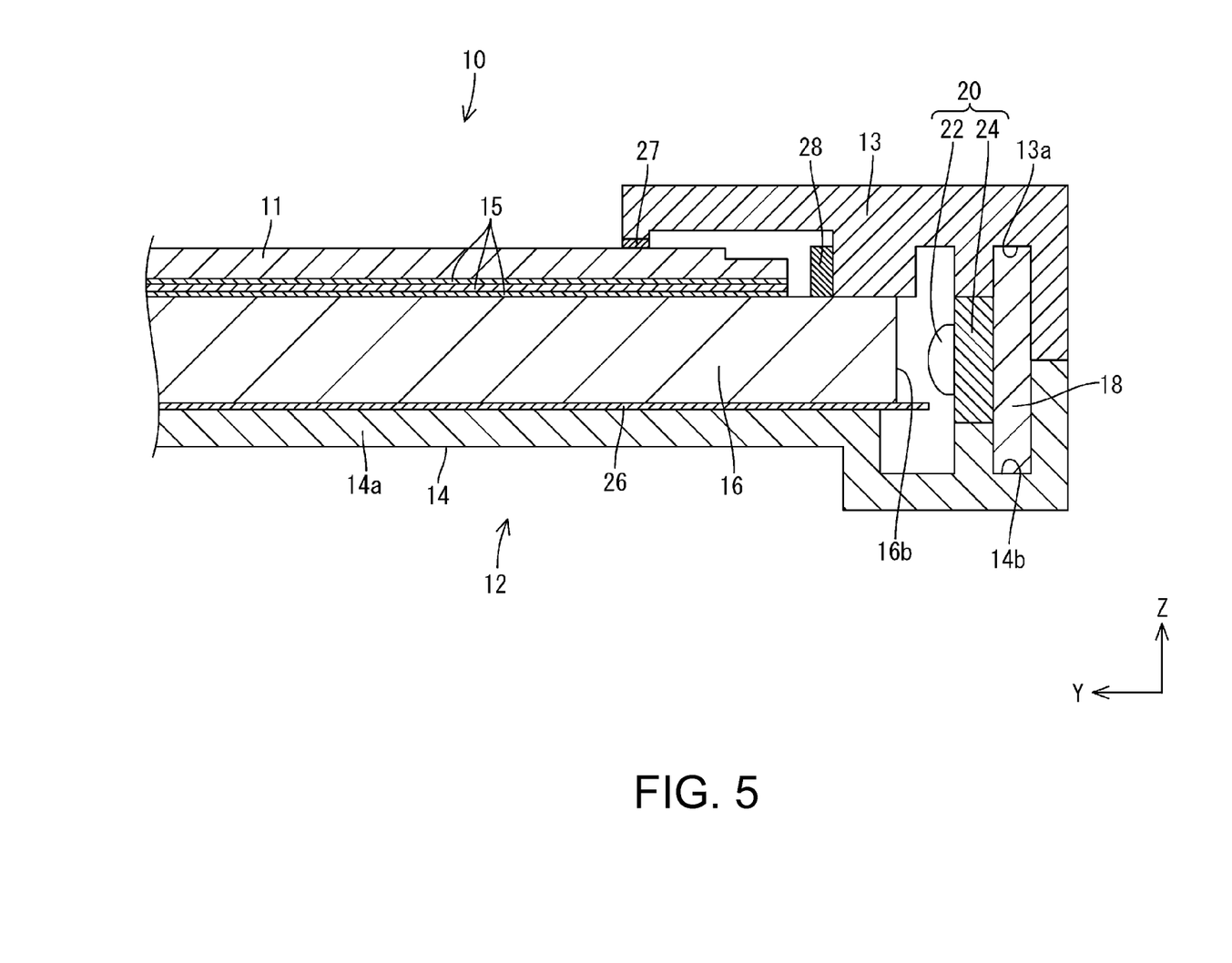
FIG. 5 is a cross-sectional view of main parts of the liquid crystal display device 10.

Next, the configuration and attachment of the heat dissipating member 18, which is a main part of the present embodiment, will be described in detail. FIG. 5 is a cross-sectional view of the main parts of the liquid crystal display device 10, showing a magnified cross-sectional view of a portion near one of the heat dissipating members 18 of FIG. 4. The configuration and attachment of both of the heat dissipating members 18 and 18 are the same. The heat dissipating member 18 is a member having heat dissipating characteristics and is arranged along the long side direction of the chassis 14 (see FIG. 3). The heat dissipating member 18 has a plate shape and is held between the chassis 14 and the frame 13 in a state in which the plate surface of the heat dissipating member 18 is perpendicular to a bottom plate 14a of the chassis 14. The LED substrate 24 is attached to one of the plate surfaces (the inner plate surface) of the heat dissipating member 18.

A first recessed area 13a with an opening in the chassis 14 is provided near the outer edge of the frame 13. A second recessed area 14b with an opening facing the frame 13 is provided near the outer edge of the chassis 14. The first recessed area 13a and second recessed area 14b are each formed in a groove shape along the long side direction of the chassis 14, and the width thereof is slightly larger than the thickness of the plate surface of the heat dissipating member 18. The top of the plate surface of the heat dissipating member 18 is housed in and engages the first recessed area 13a, and the bottom of the plate surface of the heat dissipating member 18 is housed in and engages the inside of the second recessed area 14b. In this manner, the heat dissipating member 18 is fixed by the chassis 14 and the frame 13 by being held therebetween. The surface of the heat dissipating member 18 that is opposite to the surface abutting the LED substrate 24 abuts both a portion of the chassis 14 and a portion of the frame 13, which form the side faces of the liquid crystal display device 10.

As described above, in the liquid crystal display device 10 of the present embodiment, the heat dissipating member 18 is held in place by being sandwiched between the frame 13 and the chassis 14. Therefore, in the liquid crystal display device 10 without a cabinet, it is possible to attach the heat dissipating member 18 without hindering the heat dissipating characteristics thereof by using a simple configuration with no screws or the like.

In the liquid crystal display device 10 of the present embodiment, one of the plate surfaces of the respective heat dissipating members 18 has a plate shape abutting the respective LED substrates 24. Thus, the heat dissipating members 18 can respectively engage the first recessed areas 14b and second recessed areas 13a with ease.

Furthermore, in the liquid crystal display device 10 of the present embodiment, the surface of the heat dissipating member 18 that is opposite to the surface abutting the LED substrate 24 abuts the frame 13 and the chassis 14. Therefore, the contact area of the heat dissipating member 18 with respect to the frame 13 and the chassis 14 increases, thereby making it possible to increase the heat dissipating characteristics of the heat dissipating member 18.

In the liquid crystal display device 10 of the present embodiment, the LED substrates 24 are respectively held between the frame 13 and the chassis 14. Due to the LED substrates 24 being in contact with the frame 13 and the chassis 14, the heat dissipating characteristics of the heat dissipating member 18 can be increased.

Furthermore, in the liquid crystal display device 10 of the present embodiment, the elastic members 27 and 28 are interposed between the frame 13 and the liquid crystal panel 11. This makes it possible to prevent damage by the edge of the liquid crystal panel 11 abutting the frame 13.

<Embodiment 2>

Figure 6:
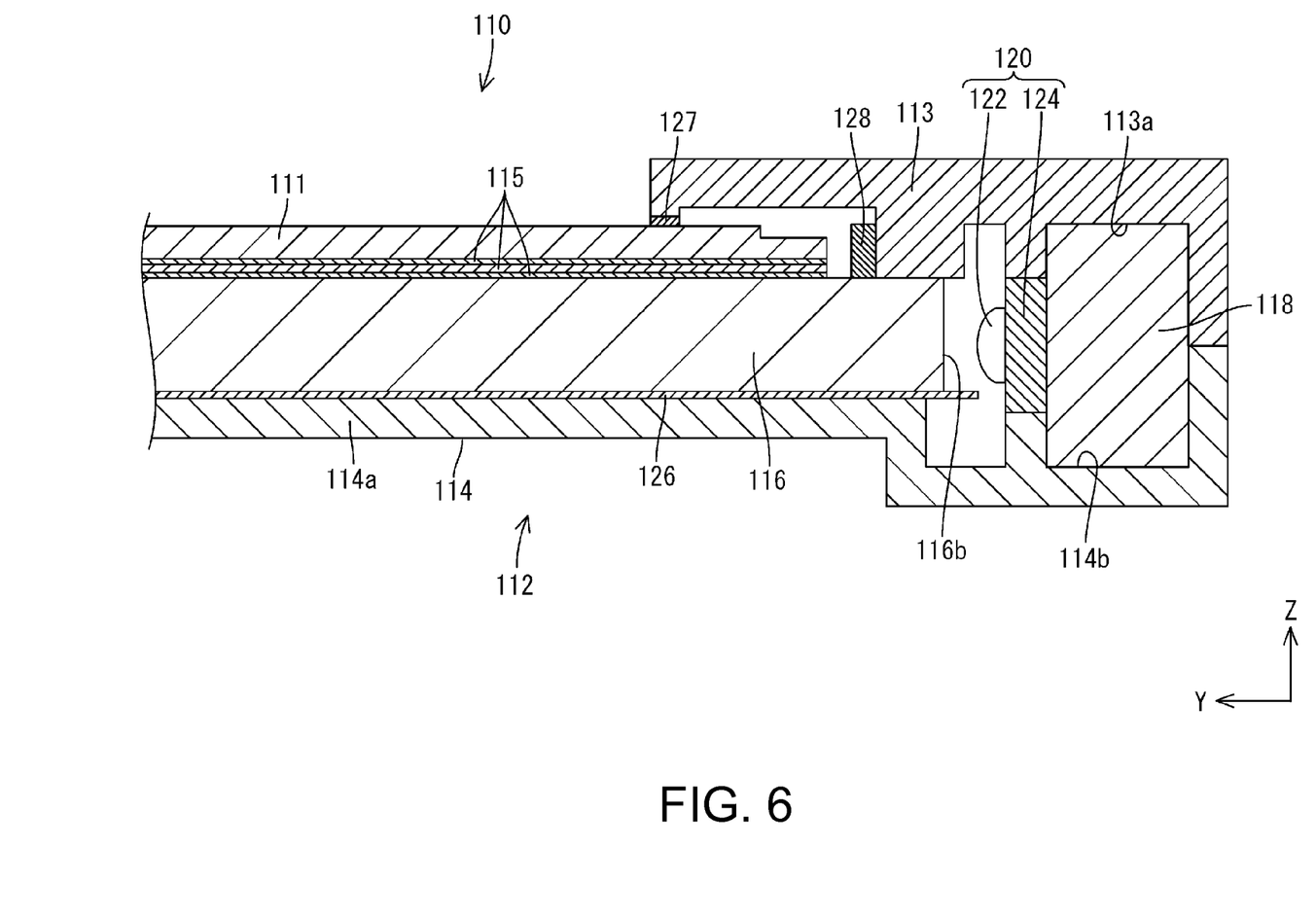
FIG. 6 is a cross-sectional view of main parts of a liquid crystal display device 110 according to Embodiment 2.

Embodiment 2 will be described with reference to the drawings. FIG. 6 shows a cross-sectional view of main parts of a liquid crystal display device 110 according to Embodiment 2. The shape of a heat dissipating member 118 in Embodiment 2 differs from that in Embodiment 1. Other elements are similar to those of Embodiment 1, and therefore, descriptions of the configurations, the operation, and the effect will be omitted. Parts in FIG. 6 that have 100 added to the reference characters of FIG. 5 are the same as these parts described in Embodiment 1.

As shown in FIG. 6, in the liquid crystal display device 110 according to Embodiment 2, the thickness (width in the Y axis direction) of the heat dissipating member 118 is larger than in Embodiment 1. Specifically, the thickness of the heat dissipating member 118 is larger than the sum of the thicknesses of LED substrates 124 and LEDs 122. With such a configuration, the contact area of the heat dissipating member 118 to a frame 113 and chassis 114 is greater than in Embodiment 1; thus, the heat dissipating characteristics of the heat dissipating member 118 can be increased.

<Embodiment 3>

Figure 7:
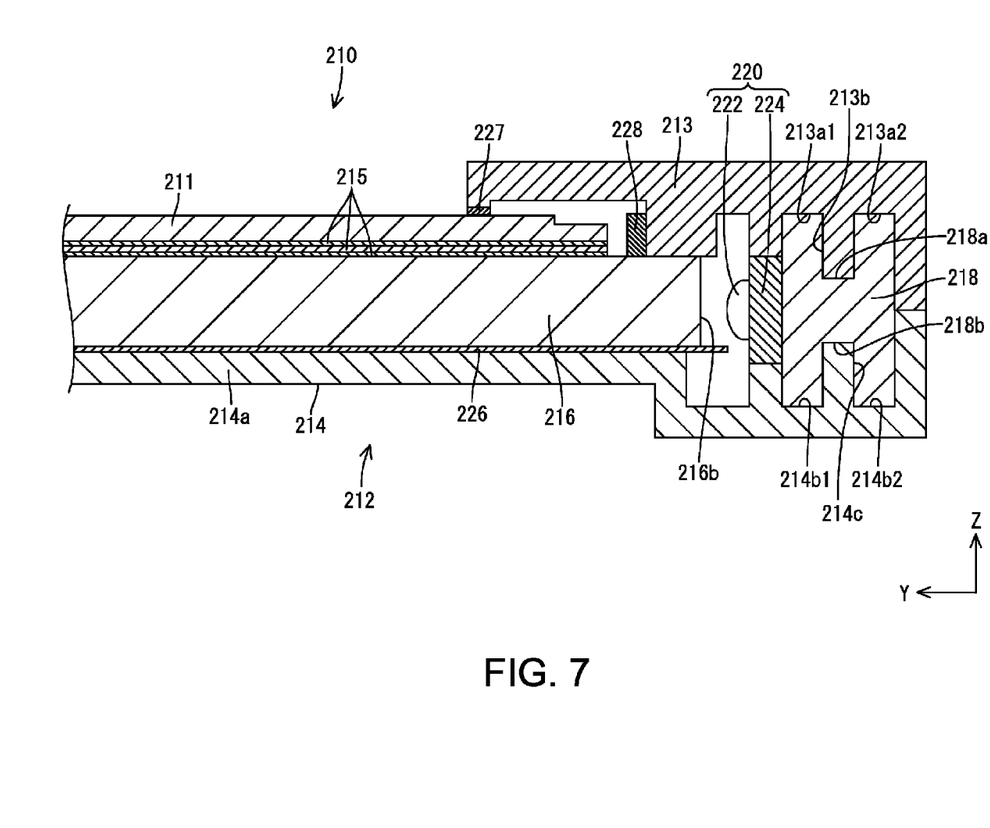
FIG. 7 is a cross-sectional view of main parts of a liquid crystal display device 210 according to Embodiment 3.

Embodiment 3 will be described with reference to the drawings. FIG. 7 shows a cross-sectional view of main parts of a liquid crystal display device 210 according to Embodiment 3. The shape of a heat dissipating member 218 in Embodiment 3 differs from that in Embodiment 1. Other elements are similar to those of Embodiment 1, and therefore, descriptions of the configurations, the operation, and the effect will be omitted. Parts in FIG. 7 that have 200 added to the reference characters of FIG. 5 are the same as these parts described in Embodiment 1.

As shown in FIG. 7, in the liquid crystal display device 210 according to Embodiment 3, a frame 213 has a first projection 213*b* that protrudes towards a chassis 214 in first recessed areas 213*a*1 and 213*a*2 and that is formed so as to be continuous in the long side direction (X axis direction) of the chassis 214. The chassis 214 has a second projection 214*c* that protrudes towards a frame 213 in second recessed areas 214*b*1 and 214*b*2 and that is formed so as to be continuous in the long side direction (X axis direction) of the chassis 214. Grooves 218*a* and 218*b* that can engage the first projection 213*b* and second projection 214*c* are respectively provided in the heat dissipating member 218. When the heat dissipating member 218 engages the first recessed area 213*a*1 and second recessed area 213*a*2, the first projection 213*b* and second projection 214*c* respectively engage the grooves 218*a* and 218*b*. With such a configuration, the contact area with respect to the frame 213 and chassis 214 is increased when the heat dissipating member 218 engages the first recessed areas 213*a*1 and 213*a*2 and the second recessed areas 214*b*1 and 214*b*2; therefore, the heat dissipating characteristics of the heat dissipating member can be increased.

The corresponding relation between the configurations of each embodiment and the configurations of the present invention will be described. The LEDs 22, 122, and 222 are examples of "light sources." The LED substrates 24, 124, and 224 are examples of "light source substrates." The frames 13, 113, and 213 are examples of "frame members." The liquid crystal display devices 10, 110, and 210 are examples of "display devices."

Modification examples of the respective embodiments above will be described below.

(1) In the respective embodiments above, the outer plate surface of the heat dissipating member abutting the frame and chassis was shown as an example, but these do not have to be abutting.

(2) In the respective embodiments above, the LED substrate being held between the frame and the chassis was shown as an example, but the arrangement of the LED substrate is not limited thereto.

(3) In addition to the respective embodiments described above, the shape, configuration, arrangement, and the like of the heat dissipating member can be appropriately modified.

(4) In the respective embodiments above, a liquid crystal display device using a liquid crystal panel as a display panel was shown as an example, but the present invention is also applicable to a display device that uses another type of display panel.

(5) In the respective embodiments above, a television receiver that includes a tuner was shown as an example, but the present invention is also applicable to a display device without a tuner.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
10, 110, 210 liquid crystal display device
11, 111, 211 liquid crystal panel
12, 112, 212 backlight device
13, 113, 213 frame
14, 114, 214 chassis
15, 115, 215 optical members
16, 116, 216 light guide plate
18, 118, 218 heat dissipating member
20, 120, 220 LED unit
22, 122, 222 LED
24, 124, 224 LED substrate
26, 126, 226 reflective sheet

The invention claimed is:

1. A display device, comprising:
light sources;
light source substrates having the light sources attached thereto;
a display panel having a display surface where display is performed with light from the light sources;
a light guide plate arranged overlapping a side of the display panel opposite to the display surface, the light guide plate having edge faces respectively facing the light sources;
a chassis arranged on a side of the light guide plate opposite to the display panel;
a frame member arranged on the display surface side of the display panel and housing the light sources, the light source substrates, the display panel, and the light guide plate together with the chassis; and
heat dissipating members having heat dissipating characteristics that respectively abut the light source substrates and that are held between the frame member and the chassis,
wherein the frame member has first recessed areas that open towards the chassis,
wherein the chassis has second recessed areas that open towards the display panel, and wherein the respective heat dissipating members are held between the frame member and the chassis such that an edge of each of the respective heat dissipating members facing the chassis and an edge of each of the respective heat dissipating members facing the frame member respectively engage the first recessed area and the second recessed area so that each of the first recessed areas engages one of the heat dissipating members and each of the second recessed areas engages one of the heat dissipating members.

2. The display device according to claim 1, wherein each of the heat dissipating members is plate-shaped and a surface thereof abuts each of the light source substrates.

3. The display device according to claim 1, wherein a surface of each of the heat dissipating members opposite to the surface abutting each of the light source substrates abuts the frame member and the chassis.

4. The display device according to claim 1, wherein each of the light source substrates is held between the frame member and the chassis.

5. The display device according to claim 1, wherein a thickness of each of the heat dissipating members is greater than a sum of a thickness of each of the light source substrates and a thickness of each of the light sources.

6. The display device according to claim 1,
wherein the frame member has first projections in the respective first recessed areas projecting towards the chassis,
wherein the chassis has second projections in the respective second recessed areas projecting towards the frame member,
wherein grooves are disposed in the respective heat dissipating members, said grooves being able to respectively engage the first projections and the second projections, and
wherein the first projections and the second projections respectively engage the grooves in a state in which the heat dissipating members respectively engage the first recessed areas and the second recessed areas.

7. The display device according to claim 1, wherein an elastic member is interposed between the frame member and the display panel.

8. The display device according to claim 1, wherein the light sources are white light emitting diodes.

9. The display device according to claim 8, wherein the display panel is a liquid crystal panel that uses liquid crystal.

10. A television receiving device comprising the display device according to claim 9.

11. The display device according to claim 1, wherein each of the second recessed areas includes a groove at a bottom of the chassis extending along a side of the chassis.

12. The display device according to claim 1, wherein each of the second recessed areas includes a plurality of grooves at a bottom of the chassis each extending along a side of the chassis.

* * * * *